Patented Mar. 3, 1942

2,275,101

UNITED STATES PATENT OFFICE 2,275,101

PRINTING INK AND PROCESS OF MAKING AND USING SAME

Carleton Ellis, Montclair, N. J.; Carleton Ellis, Jr., and Bertram Ellis and Bank of Montclair, executors of said Carleton Ellis, deceased, assignors to Ellis Laboratories, Incorporated, a corporation of New Jersey No Drawing. Application November 16, 1938, Serial No. 240,859

3 Claims. (Cl. 260—37)

This invention relates to printing inks in which a volatile solvent is substantially or completely absent. It relates rather to ordinary printing inks not being made especially for transfer purposes and in many cases not being adapted for the purpose.

It contemplates the use of molten inks which are capable on cooling of assuming the solid state.

Ordinarily for the purpose a hot or heated press is required. Electrically heated rolls and the like may be used. The paper and the type likewise may be heated if desired, and this may be accomplished in many cases simply by passing the paper over a hot roll or plate and permitting electric current to pass through the metal type, maintaining the temperature thereof lower than the melting point of the type employed. If the paper is heated, this preferably is done just prior to receiving the imprint.

A freer release of the type from the paper without stringing or sticking is thus attained. In fact, unlike transfer inks, the product is intended to be directly printed on a paper or other surface suitable for reception. And, as indicated, the composition must be free from sticking qualities which cause it to string out in an objectionable way and cause difficulties in the printing operation.

A variety of resins may be used such as rosin, rosin ester, or other ester gums, shellac, and similar natural resins. Gilsonite may be used in some cases. In other instances resins of the synthetic type such as those known as rezyls or glyptals and other synthetic resins such as coumarone and the like which are not readily saponifiable and may be used to advantage where the ink is likely to be confronted with solubility resistance to aqueous alkalies and the like. The phenol formaldehyde product may be used in some cases. Likewise sulphur and especially a sulphur composition which has been plasticized by the addition of a resinous material soluble or dispersible in the sulphur material when the latter has been molten by heat.

There are also a number of modifying agents which may be used, such as soaps, sulphonated oils and various kinds of wax such as beeswax, paraffin wax and other waxes, such as shellac wax, carnauba wax and the like. Montan wax may be used especially in the crude or dark form. Additional modifying agents may be cellulose ethers or esters, the ethers including ethyl cellulose, benzyl cellulose and the like, and the esters including cellulose butyrate and the like.

Thus, the printing ink of the present invention comprises a fusible solid mass containing pigment and a flexible binder therefor, the latter being made up preferably of fusible resinous parties with a small percentage or proportion of a plasticizing agent which preferably is non-volatile and serves as a flexibilizer for the resinous parties; the composition being adapted to be applied by melting and heating above the sticking point of the binder in a printing apparatus capable of being heated, the heat being also applied to and including the type employed, the whole press or apparatus involved preferably being operated as a hot unit.

As stated, plasticizers of a substantially non-volatile type may be employed, such as triphenyl- or cresyl-phosphates, dibutyl phthalate, also mineral oils, and in general any heavy oily miscible materials such as tung oil, fats, and various glyceride oils, including even the drying oils themselves.

In the following examples are given a variety of compositions but it should be understood that I do not wish to be limited thereby as the disclosure is one which would permit of considerable latitude in composition.

Example 1

| | Parts |
|---|---|
| Carbon black | 20 |
| Sulphur plasticized with sulphur resin | 100 |
| Beeswax | 3 |

This composition melts at slightly below 100° C. In other words, the softening point is between 95° C. and 100° C. This melting point is often desirable since the composition is not exposed as a general thing to boiling water and therefore may melt at a lower temperature than that of boiling water. This is not the case when a transfer ink of the most desirable type is employed.

Example 2

In this formulation ethyl cellulose is used but the latter has the disadvantage of raising the melting point unduly. The composition is:

| | Parts |
|---|---|
| Ethyl cellulose | 3 |
| Carbon black | 10 |
| Beeswax | 3 |
| Sulphur plasticized with sulphur resin | 100 |

Example 3

| | Parts |
|---|---|
| Carbon black | 15 |
| Beeswax | 5 |
| Ethyl cellulose | 5 |
| Soap | 5 |
| Sulphur and sulphur resin | 100 |

In the foregoing examples plasticized sulphur was used, which contained 60% of elemental sulphur and 40% of a resin made by reacting cresylic acid with sulphur monochloride in the ratio of 1 part of the former to 1.3 parts of the latter.

Example 4

| | Parts |
|---|---|
| Ester gum (rosin ester) | 100 |
| Ethyl cellulose | 2 |
| Carbon black | 10 |
| Beeswax | 5 |

This composition has too high a melting point to be serviceable as an ordinary printing ink.

Example 5

| | Parts |
|---|---|
| Carbon black | 15 |
| Ester gum | 100 |
| Beeswax | 5 |

This has a melting point at least 10° below the composition of Example 4.

As a rule the addition of wax lowers the sticking or stringing temperature and allows the more ready release of the type from the paper surface which is being printed. Dammar resin is not as good as rosin ester for the purpose aforesaid as it has a more difficult type of solubility which renders it not as readily miscible with some of the ingredients preferably used.

One advantage of using a printing ink melting below the boiling point of water is that the ink may be recovered from the paper as, for instance, by macerating the paper in boiling water, whereupon the ink melts and may be removed from the pulp leaving the latter in a state where it can be employed again as paper stock.

Wax, as stated, lowers the melting point and is useful for that purpose in addition to the advantage of its use in allowing a working of the ink in a freer way. Thus a melting point of say, 90° C. or less may be used in some instances when recovery of the paper and ink is contemplated.

The printing ink of the present invention thus differs from ordinary printing ink in directly printing as a final step in the printing operation of paper or other material.

As stated in the foregoing, various synthetic resins may be used in place of the natural resins. Likewise in some cases cellulose acetate, although this is more difficult to melt and requires a plasticizing agent. Vinyl acetate may, however, be used such, for example, as a product known as Gelva which melts at about 85° C., although this remains sticky and/or stringy up to 115° C. Nevertheless the vinyl type of resin gives a clear and colorless film which is readily pigmented.

Another resin which may be used is the type known as Teglac #15 (an oil-soluble modified glycerol phthalate resin) which melts at about 86–90° C. and gives a yellow sticky resin. At about 140–150° C. it seems to have a good consistency for binding the coloring matter of the ink to the paper. It should, however, be modified as it still remains sticky and wax is suggested for the purpose.

Polystyrene may be used or polystyrene which has been reacted with maleic anhydride, the latter, however, has a fairly high melting point and is therefore not as desirable.

The type of synthetic resins known as Rezyl 1102 (an oil-soluble modified glycerol phthalate resin) is thoroughly molten at 120° C. and at 120–130° C. gives a very useful printing ink binder. This may be modified, however, by wax or one of the other modifying agents.

A resin made from phthalic anhydride and triethanolamine with oleic acid melted at 45° C, and forms a very soft and runny viscous liquid which is caramel-like in appearance. Wax, therefore, is suggested as a thinning agent to render this less viscous.

A form of Bakelite, namely, BR254 (an oil-soluble phenyl-phenol-formaldehyde resin), softened at 60°–80° C. and at 100°–120° C. was thoroughly molten and clear. The stringing difficulties which were encountered when using this material could be definitely reduced by the addition of waxy stock.

A Congo resin which softened at about 60° C. was a very gummy mass until about 100° C. was reached. At that point it remained a very sticky, fibery mass even at 120–130° C.

A Congo gum ester, however, which softened somewhat at 90° C. was very sticky and practically non-mobile at 140° C. A binder of this sort can bear a considerable addition of wax to thin and cut down the stickiness.

Ordinary rosin which was very thick at 130–140° C. should be modified considerably by the addition of wax, mineral oil or other thinning agent.

What I claim is:

1. A fusible printing ink being solid at ordinary atmospheric temperatures comprising a pigment, sulphur and a plasticizer therefor consisting of a synthetic resin made by interaction of sulphur monochloride and cresylic acid, said ink being adapted while hot for printing on surfaces and drying and hardening of said ink being attained solely by cooling to atmospheric temperature.

2. A fusible printing ink according to claim 1 which is fusible at a temperature of 95° to 100° C.

3. A fusible printing ink according to claim 1 in which the proportion by weight of sulphur to plasticizer is 60:40.

CARLETON ELLIS.